US008754832B2

(12) United States Patent
Maxik et al.

(10) Patent No.: US 8,754,832 B2
(45) Date of Patent: Jun. 17, 2014

(54) LIGHTING SYSTEM FOR ACCENTING REGIONS OF A LAYER AND ASSOCIATED METHODS

(71) Applicant: Lighting Science Group Corporation, Satellite Beach, FL (US)

(72) Inventors: Fredric S. Maxik, Indialantic, FL (US); David E. Bartine, Cocoa, FL (US); Robert R. Soler, Cocoa Beach, FL (US); Mark Andrew Oostdyk, Cape Canaveral, FL (US); Addy S. Widjaja, Palm Bay, FL (US); Matthew Regan, Melbourne, FL (US)

(73) Assignee: Lighting Science Group Corporation, Satellite Beach, FL (US)

( * ) Notice: Subject to any disclaimer, the term of this patent is extended or adjusted under 35 U.S.C. 154(b) by 0 days.

(21) Appl. No.: 13/753,890

(22) Filed: Jan. 30, 2013

(65) Prior Publication Data
US 2013/0278173 A1    Oct. 24, 2013

Related U.S. Application Data

(63) Continuation-in-part of application No. 13/709,942, filed on Dec. 10, 2012, and a continuation-in-part of (Continued)

(51) Int. Cl.
*G09G 3/14* (2006.01)
*G09G 3/16* (2006.01)
(Continued)

(52) U.S. Cl.
CPC ............... *G09G 5/02* (2013.01); *G06T 11/001* (2013.01)
USPC ............... 345/46; 345/691; 345/207; 345/48; 345/77; 345/589; 348/798; 349/68; 349/71; 359/238; 359/309; 398/95

(58) Field of Classification Search
USPC ......... 345/426, 428, 589, 609–691, 204, 207; 345/211, 214, 22, 45–46, 48, 63–64, 76–77, 345/84, 581; 340/870.17, 870.18, 870.25, 340/870.26, 815.75; 315/82, 151, 154–156, 315/291, 307; 398/79, 90–95, 98, 196–197; 348/44, 54–55, 68–70, 269, 798, 801; 349/8, 61, 68–71; 359/282, 237–238, 359/292, 298, 309–310, 577
See application file for complete search history.

(56) References Cited

U.S. PATENT DOCUMENTS 5,523,878 A    6/1996    Wallace et al.
(Continued)

FOREIGN PATENT DOCUMENTS

CN    101 702 421 A    5/2010
EP    0851260    7/1998
(Continued)

OTHER PUBLICATIONS

U.S. Appl. No. 13/311,300, filed Dec. 2011, Frederic S. Maxik et al.
(Continued)

*Primary Examiner* — Wesner Sajous
(74) *Attorney, Agent, or Firm* — Mark R. Malek; Daniel C. Pierron; Zies Widerman & Malek

(57) ABSTRACT

A system and method for accenting regions of a layer including a lighting system including a plurality of light sources operable to emit polychromatic light and a layer having two or more regions configured to diffusively scatter light within a wavelength range while absorbing light not within the wavelength range. The regions may be configured to represent recognizable characters or images, and may form a sequence. The lighting system may highlight the regions individually or simultaneously. The layer may be attachable to a surface and may further include non-highlighted regions. The system may also include appliqués applied to a surface and a cover layer transparent to certain wavelengths of light that the appliqués scatter.

21 Claims, 3 Drawing Sheets

Related U.S. Application Data application No. 13/107,928, filed on May 15, 2011, now Pat. No. 8,547,939, and a continuation-in-part of application No. 13/234,371, filed on Sep. 16, 2011, now Pat. No. 8,465,167.

(60) Provisional application No. 61/643,308, filed on May 6, 2012, provisional application No. 61/643,316, filed on May 6, 2012.

(51) Int. Cl.
*G09G 3/30* (2006.01)
*G09G 5/00* (2006.01)
*G09G 5/10* (2006.01)
*H04N 3/12* (2006.01)
*G02F 1/1335* (2006.01)
*G02B 26/00* (2006.01)
*G02F 1/33* (2006.01)
*H04J 14/02* (2006.01)
*G09G 5/02* (2006.01)
*G06T 11/00* (2006.01)

(56) References Cited

U.S. PATENT DOCUMENTS

| | | |
|---|---|---|
| 5,680,230 A | 10/1997 | Kaburagi et al. |
| 5,704,701 A | 1/1998 | Kavanagh et al. |
| 5,813,753 A | 9/1998 | Vriens et al. |
| 5,997,150 A | 12/1999 | Anderson |
| 6,140,646 A | 10/2000 | Busta et al. |
| 6,259,572 B1 | 7/2001 | Meyer, Jr. |
| 6,341,876 B1 | 1/2002 | Moss et al. |
| 6,356,700 B1 | 3/2002 | Strobl |
| 6,459,919 B1 | 10/2002 | Lys et al. |
| 6,528,954 B1 | 3/2003 | Lys et al. |
| 6,561,656 B1 | 5/2003 | Kojima et al. |
| 6,577,080 B2 | 6/2003 | Lys et al. |
| 6,586,882 B1 | 7/2003 | Harbers |
| 6,594,090 B2 | 7/2003 | Kruschwitz et al. |
| 6,733,135 B2 | 5/2004 | Dho |
| 6,734,639 B2 | 5/2004 | Chang et al. |
| 6,762,562 B2 | 7/2004 | Leong |
| 6,767,111 B1 | 7/2004 | Lai |
| 6,817,735 B2 | 11/2004 | Shimizu et al. |
| 6,870,523 B1 | 3/2005 | Ben-David et al. |
| 6,871,982 B2 | 3/2005 | Holman et al. |
| 6,967,761 B2 | 11/2005 | Starkweather et al. |
| 6,974,713 B2 | 12/2005 | Patel et al. |
| 7,012,542 B2 | 3/2006 | Powell et al. |
| 7,034,934 B2 | 4/2006 | Manning |
| 7,042,623 B1 | 5/2006 | Huibers et al. |
| 7,058,197 B1 | 6/2006 | McGuire et al. |
| 7,070,281 B2 | 7/2006 | Kato |
| 7,072,096 B2 | 7/2006 | Holman et al. |
| 7,075,707 B1 | 7/2006 | Rapaport et al. |
| 7,083,304 B2 | 8/2006 | Rhoads |
| 7,095,053 B2 | 8/2006 | Mazzochette et al. |
| 7,140,752 B2 | 11/2006 | Ashdown |
| 7,144,131 B2 | 12/2006 | Rains |
| 7,157,745 B2 | 1/2007 | Blonder et al. |
| 7,178,941 B2 | 2/2007 | Roberge et al. |
| 7,184,201 B2 | 2/2007 | Duncan |
| 7,187,484 B2 | 3/2007 | Mehrl |
| 7,213,926 B2 | 5/2007 | May et al. |
| 7,234,844 B2 | 6/2007 | Bolta et al. |
| 7,246,923 B2 | 7/2007 | Conner |
| 7,247,874 B2 | 7/2007 | Bode et al. |
| 7,252,408 B2 | 8/2007 | Mazzochette et al. |
| 7,255,469 B2 | 8/2007 | Wheatley et al. |
| 7,261,453 B2 | 8/2007 | Morejon et al. |
| 7,289,090 B2 | 10/2007 | Morgan |
| 7,300,177 B2 | 11/2007 | Conner |
| 7,303,291 B2 | 12/2007 | Ikeda et al. |
| 7,319,293 B2 | 1/2008 | Maxik |
| 7,319,298 B2 | 1/2008 | Jungwirth et al. |
| 7,324,076 B2 | 1/2008 | Lee et al. |
| 7,325,956 B2 | 2/2008 | Morejon et al. |
| 7,342,658 B2 | 3/2008 | Kowarz et al. |
| 7,344,279 B2 | 3/2008 | Mueller et al. |
| 7,349,095 B2 | 3/2008 | Kurosaki |
| 7,353,859 B2 | 4/2008 | Stevanovic et al. |
| 7,369,056 B2 | 5/2008 | McCollough et al. |
| 7,382,091 B2 | 6/2008 | Chen |
| 7,382,632 B2 | 6/2008 | Alo et al. |
| 7,400,439 B2 | 7/2008 | Holman |
| 7,427,146 B2 | 9/2008 | Conner |
| 7,429,983 B2 | 9/2008 | Islam |
| 7,434,946 B2 | 10/2008 | Huibers |
| 7,436,996 B2 | 10/2008 | Ben-Chorin |
| 7,438,443 B2 | 10/2008 | Tatsuno et al. |
| 7,476,016 B2 | 1/2009 | Kurihara |
| 7,497,596 B2 | 3/2009 | Ge |
| 7,520,607 B2 | 4/2009 | Casper et al. |
| 7,520,642 B2 | 4/2009 | Holman et al. |
| 7,521,875 B2 | 4/2009 | Maxik |
| 7,528,421 B2 | 5/2009 | Mazzochete |
| 7,530,708 B2 | 5/2009 | Park |
| 7,537,347 B2 | 5/2009 | Dewald |
| 7,540,616 B2 | 6/2009 | Conner |
| 7,556,376 B2 | 7/2009 | Ishak et al. |
| 7,556,406 B2 | 7/2009 | Petroski et al. |
| 7,573,210 B2 | 8/2009 | Ashdown et al. |
| 7,598,686 B2 | 10/2009 | Lys et al. |
| 7,598,961 B2 | 10/2009 | Higgins |
| 7,605,971 B2 | 10/2009 | Ishii et al. |
| 7,619,372 B2 | 11/2009 | Garrity |
| 7,626,755 B2 | 12/2009 | Furuya et al. |
| 7,633,093 B2 | 12/2009 | Blonder et al. |
| 7,633,779 B2 | 12/2009 | Garrity et al. |
| 7,637,643 B2 | 12/2009 | Maxik |
| 7,677,736 B2 | 3/2010 | Kasazumi et al. |
| 7,678,140 B2 | 3/2010 | Brainard et al. |
| 7,679,281 B2 | 3/2010 | Kim et al. |
| 7,684,007 B2 | 3/2010 | Hull et al. |
| 7,687,753 B2 | 3/2010 | Ashdown |
| 7,703,943 B2 | 4/2010 | Li et al. |
| 7,705,810 B2 | 4/2010 | Choi et al. |
| 7,708,452 B2 | 5/2010 | Maxik et al. |
| 7,709,811 B2 | 5/2010 | Conner |
| 7,719,766 B2 | 5/2010 | Grasser et al. |
| 7,728,846 B2 | 6/2010 | Higgins et al. |
| 7,732,825 B2 | 6/2010 | Kim et al. |
| 7,748,845 B2 | 7/2010 | Casper et al. |
| 7,766,490 B2 | 8/2010 | Harbers et al. |
| 7,819,556 B2 | 10/2010 | Heffington et al. |
| 7,828,453 B2 | 11/2010 | Tran et al. |
| 7,828,465 B2 | 11/2010 | Roberge et al. |
| 7,832,878 B2 | 11/2010 | Brukilacchio et al. |
| 7,834,867 B2 | 11/2010 | Sprague et al. |
| 7,835,056 B2 | 11/2010 | Doucet et al. |
| 7,841,714 B2 | 11/2010 | Grueber |
| 7,845,823 B2 | 12/2010 | Mueller et al. |
| 7,855,376 B2 | 12/2010 | Cantin et al. |
| 7,871,839 B2 | 1/2011 | Lee |
| 7,880,400 B2 | 2/2011 | Zhoo et al. |
| 7,889,430 B2 | 2/2011 | El-Ghoroury et al. |
| 7,906,789 B2 | 3/2011 | Jung et al. |
| 7,928,565 B2 | 4/2011 | Brunschwiler et al. |
| 7,972,030 B2 | 7/2011 | Li |
| 7,976,182 B2 | 7/2011 | Ribarich |
| 7,976,205 B2 | 7/2011 | Grotsch et al. |
| 8,016,443 B2 | 9/2011 | Falicoff et al. |
| 8,040,070 B2 | 10/2011 | Myers et al. |
| 8,047,660 B2 | 11/2011 | Penn et al. |
| 8,049,763 B2 | 11/2011 | Kwak et al. |
| 8,061,857 B2 | 11/2011 | Liu et al. |
| 8,070,302 B2 | 12/2011 | Hatanaka et al. |
| 8,076,680 B2 | 12/2011 | Lee et al. |
| 8,083,364 B2 | 12/2011 | Allen |
| 8,096,668 B2 | 1/2012 | Abu-Ageel |
| 8,115,419 B2 | 2/2012 | Given et al. |
| 8,164,844 B2 | 4/2012 | Toda et al. |

(56) References Cited

U.S. PATENT DOCUMENTS

| | | | |
|---|---|---|---|
| 8,182,106 B2 | 5/2012 | Shin | |
| 8,182,115 B2 | 5/2012 | Takahashi et al. | |
| 8,188,687 B2 | 5/2012 | Lee et al. | |
| 8,192,047 B2 | 6/2012 | Bailey et al. | |
| 8,207,676 B2 | 6/2012 | Hilgers | |
| 8,212,836 B2 | 7/2012 | Matsumoto et al. | |
| 8,243,278 B2 | 8/2012 | Valois et al. | |
| 8,253,336 B2 | 8/2012 | Maxik et al. | |
| 8,255,487 B2 | 8/2012 | Valois et al. | |
| 8,256,921 B2 | 9/2012 | Crookham et al. | |
| 8,264,172 B2 | 9/2012 | Valois et al. | |
| 8,274,089 B2 | 9/2012 | Lee | |
| 8,297,783 B2 | 10/2012 | Kim | |
| 8,304,978 B2 | 11/2012 | Kim et al. | |
| 8,310,171 B2 | 11/2012 | Reisenauer et al. | |
| 8,319,445 B2 | 11/2012 | McKinney et al. | |
| 8,324,808 B2 | 12/2012 | Maxik et al. | |
| 8,324,823 B2 | 12/2012 | Choi et al. | |
| 8,324,840 B2 | 12/2012 | Shteynberg et al. | |
| 8,331,099 B2 | 12/2012 | Geissler et al. | |
| 8,337,029 B2 | 12/2012 | Li | |
| 8,378,574 B2 | 2/2013 | Schlangen et al. | |
| 8,401,231 B2 | 3/2013 | Maxik et al. | |
| 8,408,725 B1* | 4/2013 | Maxik et al. | 362/84 |
| 8,492,995 B2 | 7/2013 | Maxik et al. | |
| 2002/0113555 A1 | 8/2002 | Lys et al. | |
| 2004/0052076 A1 | 3/2004 | Mueller et al. | |
| 2004/0093045 A1 | 5/2004 | Bolta | |
| 2004/0119086 A1 | 6/2004 | Yano et al. | |
| 2005/0189557 A1 | 9/2005 | Mazzochete et al. | |
| 2005/0218780 A1 | 10/2005 | Chen | |
| 2005/0267213 A1 | 12/2005 | Gold et al. | |
| 2006/0002108 A1 | 1/2006 | Ouderkirk et al. | |
| 2006/0002110 A1 | 1/2006 | Dowling et al. | |
| 2006/0164005 A1 | 7/2006 | Sun | |
| 2006/0186431 A1* | 8/2006 | Miki et al. | 257/100 |
| 2006/0285193 A1 | 12/2006 | Kimura et al. | |
| 2007/0013871 A1 | 1/2007 | Marshall et al. | |
| 2007/0159492 A1 | 7/2007 | Lo et al. | |
| 2007/0262714 A1 | 11/2007 | Bylsma | |
| 2008/0119912 A1 | 5/2008 | Hayes | |
| 2008/0143973 A1 | 6/2008 | Wu | |
| 2008/0198572 A1 | 8/2008 | Medendorp | |
| 2008/0232084 A1 | 9/2008 | Kon | |
| 2009/0059585 A1 | 3/2009 | Chen et al. | |
| 2009/0128781 A1 | 5/2009 | Li | |
| 2009/0231833 A1* | 9/2009 | Miki et al. | 362/84 |
| 2009/0232683 A1 | 9/2009 | Hirata et al. | |
| 2009/0273931 A1 | 11/2009 | Ito et al. | |
| 2009/0303694 A1 | 12/2009 | Roth et al. | |
| 2010/0001652 A1 | 1/2010 | Damsleth | |
| 2010/0006762 A1 | 1/2010 | Yoshida et al. | |
| 2010/0051976 A1 | 3/2010 | Rooymans | |
| 2010/0053959 A1 | 3/2010 | Ijzerman et al. | |
| 2010/0076250 A1 | 3/2010 | Van Woudenberg | |
| 2010/0084992 A1* | 4/2010 | Valois et al. | 315/291 |
| 2010/0103389 A1 | 4/2010 | McVea et al. | |
| 2010/0157573 A1 | 6/2010 | Toda et al. | |
| 2010/0202129 A1 | 8/2010 | Abu-Ageel | |
| 2010/0213859 A1 | 8/2010 | Shteynberg et al. | |
| 2010/0231131 A1 | 9/2010 | Anderson | |
| 2010/0231863 A1 | 9/2010 | Hikmet et al. | |
| 2010/0244700 A1 | 9/2010 | Chong et al. | |
| 2010/0244724 A1 | 9/2010 | Jacobs et al. | |
| 2010/0244735 A1 | 9/2010 | Buelow, II | |
| 2010/0244740 A1 | 9/2010 | Alpert et al. | |
| 2010/0270942 A1 | 10/2010 | Hui et al. | |
| 2010/0277084 A1 | 11/2010 | Lee et al. | |
| 2010/0277316 A1 | 11/2010 | Schlangen | |
| 2010/0302464 A1 | 12/2010 | Raring et al. | |
| 2010/0308738 A1 | 12/2010 | Shteynberg et al. | |
| 2010/0315320 A1 | 12/2010 | Yoshida | |
| 2010/0320927 A1 | 12/2010 | Gray et al. | |
| 2010/0320928 A1 | 12/2010 | Kaihotsu et al. | |
| 2010/0321641 A1 | 12/2010 | Van Der Lubbe | |
| 2011/0012137 A1 | 1/2011 | Lin et al. | |
| 2011/0080635 A1 | 4/2011 | Takeuchi | |
| 2011/0310446 A1 | 12/2011 | Komatsu | |
| 2012/0021525 A1* | 1/2012 | Fehr et al. | 436/94 |
| 2012/0249013 A1* | 10/2012 | Valois et al. | 315/291 |
| 2012/0250137 A1 | 10/2012 | Maxik et al. | |
| 2012/0280625 A1 | 11/2012 | Zampini et al. | |
| 2012/0285667 A1 | 11/2012 | Maxik et al. | |
| 2012/0286700 A1 | 11/2012 | Maxik et al. | |
| 2013/0070439 A1 | 3/2013 | Maxik et al. | |
| 2013/0120963 A1 | 5/2013 | Holland et al. | |
| 2013/0223055 A1 | 8/2013 | Holland et al. | |
| 2013/0257312 A1 | 10/2013 | Maxik et al. | |

FOREIGN PATENT DOCUMENTS

| | | |
|---|---|---|
| JP | 2008226567 | 9/2008 |
| WO | WO 03098977 | 11/2003 |
| WO | WO 2004011846 A1 | 2/2004 |
| WO | WO 2006001221 A1 | 1/2006 |
| WO | WO 2009/121539 A1 | 10/2009 |
| WO | WO2012064470 | 5/2012 |
| WO | WO2012135173 | 10/2012 |
| WO | WO2012158665 | 11/2012 |
| WO | 2012067916 | 12/2012 |

OTHER PUBLICATIONS

U.S. Appl. No. 13/709,942, filed Dec. 2012, Frederic S. Maxik et al.
U.S. Appl. No. 13/715,085, filed Dec. 2012, Frederic S. Maxik et al.
U.S. Appl. No. 13/737,606, filed Jan. 2013, Frederic S. Maxik et al.
U.S. Appl. No. 13/739,665, filed Jan. 2013, Frederic S. Maxik et al.
U.S. Appl. No. 13/775,936, filed Feb. 2013, Frederic S. Maxik et al.
U.S. Appl. No. 13/792,354, filed Mar. 2013, Frederic S. Maxik et al.
U.S. Appl. No. 13/803,825, filed Mar. 2013, Frederic S. Maxik et al.
U.S. Appl. No. 13/832,459, filed Mar. 2013, Frederic S. Maxik et al.
U.S. Appl. No. 13/837,643, filed Mar. 2013, Frederic S. Maxik et al.
U.S. Appl. No. 13/842,875, filed Mar. 2013, Eric Holland et al.
Arthur P. Fraas, Heat Exchanger Design, 1989, p. 60, John Wiley & Sons, Inc., Canada.
Boeing, (Jul. 6, 2011), International Space Program, S684-13489 Revision A "ISS Interior Solid State Lighting Assembly (SSLA) Specification", Submitted to National Aeronautics and Space Administration, Johnson Space Center, Contract No. NAS15-10000, pp. 1-60.
Brainard, et al., (Aug. 15, 2001), "Action Spectrum for Melatonin Regulation in Humans: Evidence for a Novel Circadian Photoreceptor", The Journal of Neuroscience, 21(16):6405-6412.
Binnie et al. (1979) "Fluorescent Lighting and Epilepsy" Epilepsia 20(6):725-727.
Charamisinau et al. (2005) "Semiconductor laser insert with Uniform Illumination for Use in Photodynamic Therapy" Appl Opt 44(24):5055-5068.
ERBA Shedding Light on Photosensitivity, One of Epilepsy's Most Complex Conditions. Photosensitivity and Epilepsy. Epilepsy Foundation. Accessed: Aug. 28, 2009. http://www.epilepsyfoundation.org/aboutepilepsy/seizures/photosensitivity-/gerba.cfm.
Figueiro et al. (2004) "Spectral Sensitivity of the Circadian System" Proc. SPIE 5187:207.
Figueiro et al. (2008) "Retinal Mechanisms Determine the Subadditive Response to Polychromatic Light by the Human Circadian System" Neurosci Lett 438(2):242.
Gabrecht et al. (2007) "Design of a Light Delivery System for the Photodynamic Treatment of the Crohn's Disease" Proc. SPIE 6632:1-9.
H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.
Happawana et al. (2009) "Direct De-Ionized Water-Cooled Semiconductor Laser Package for Photodynamic Therapy of Esophageal Carcinoma: Design and Analysis" J Electron Pack 131(2):1-7.
Harding & Harding (1999) "Televised Material and Photosensitive Epilepsy" Epilepsia 40(Suppl. 4):65.

(56) References Cited

OTHER PUBLICATIONS

Jones, Eric D., Light Emitting Diodes (LEDS) for General Lumination, an Optoelectronics Industry Development Association (OIDA) Technology Roadmap, OIDA Report, Mar. 2001, published by OIDA in Washington D.C.

J. Y. San, C. H. Huang, M. H, Shu, "Impingement cooling of a confined circular air jet", In t. J. Heat Mass Transf., 1997. pp. 1355-1364, vol. 40.

Kuller & Laike (1998) "The Impact of Flicker from Fluorescent Lighting on Well-Being, Perfiormance and Physiological Arousal" Ergonomics 41(4):433-447.

Lakatos (2006) "Recent trends in the epidemiology of Inflammatory Bowel Disease: Up or Down?" World J Gastroenterol 12(38):6102.

Mehta, Arpit, "Map Colors of a CIE Plot and Color Temperature Using an RGB Color Sensor", Strategic Applications Engineer, Maxim Integrated Products, A1026, p. 1-11, (2005).

N. T. Obot, W. J. Douglas, A S. Mujumdar, "Effect of Semi-confinement on Impingement Heat Transfer", Proc. 7th Int. Heat Transf. Conf., 1982, pp. 1355-1364. vol. 3.

Ortner & Dorta (2006) "Technology Insight: Photodynamic Therapy for Cholangiocarcinoma" Nat Clin Pract Gastroenterol Hepatol 3(8):459-467.

Rea (2010) "Circadian Light" J Circadian Rhythms 8(1):2.

Rea et al. (2010) "The Potential of Outdoor Lighting for Stimulating the Human Circadian System" Alliance for Solid-State Illumination Systems and Technologies (ASSIST), May 13, 2010, p. 1-11.

Rosco Laboratories Poster "Color Filter Technical Data Sheet: #87 Pale Yellow Green" (2001).

S. A Solovitz, L. D. Stevanovic, R. A Beaupre, "Microchannels Take Heatsinks to the Next Level", Power Electronics Technology, Nov. 2006.

Stevens (1987) "Electronic Power Use and Breast Cancer: A Hypothesis" Am J Epidemiol 125(4):556-561.

Tannith Cattermole, "Smart Energy Class controls light on demand", Gizmag.com, Apr. 18, 2010 accessed Nov. 1, 2011.

Topalkara et al. (1998) "Effects of flash frequency and repetition of intermittent photic stimulation on photoparoxysmal responses" Seizure 7(13):249-253.

Veitch & McColl (1995) "Modulation of Fluorescent Light: Flicker Rate and Light Source Effects on Visual Performance and Visual Comfort" Lighting Research and Technology 27:243-256.

Wang (2005) "The Critical Role of Light in Promoting Intestinal Inflammation and Crohn's Disease" J Immunol 174 (12):8173-8182.

Wilkins et al. (1979) "Neurophysical aspects of pattern-sensitive epilepsy" Brain 102:1-25.

Wilkins et al. (1989) "Fluorescent lighting, headaches, and eyestrain" Lighting Res Technol 21(1):11-18.

Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

\* cited by examiner

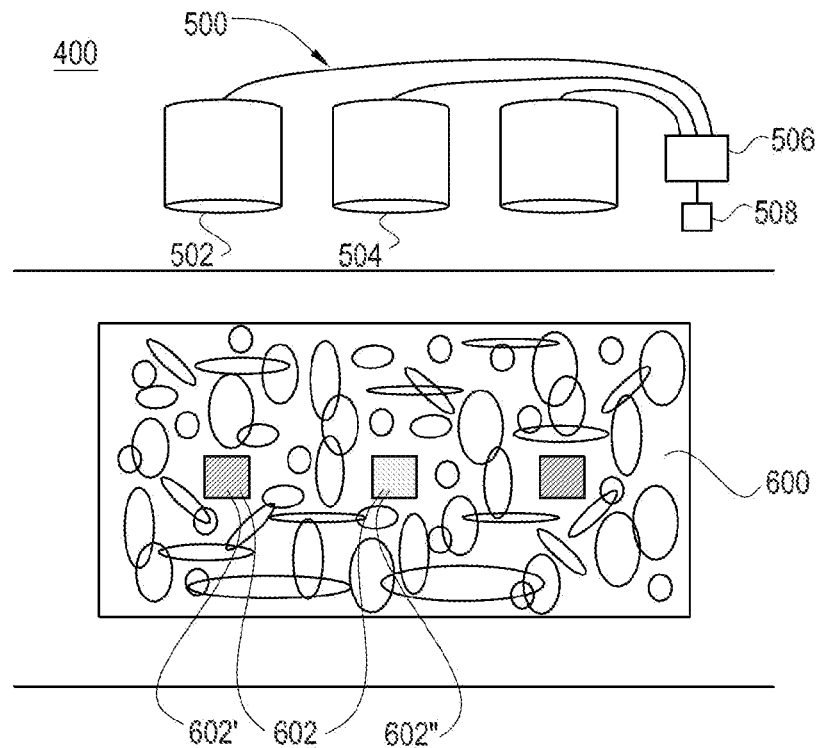
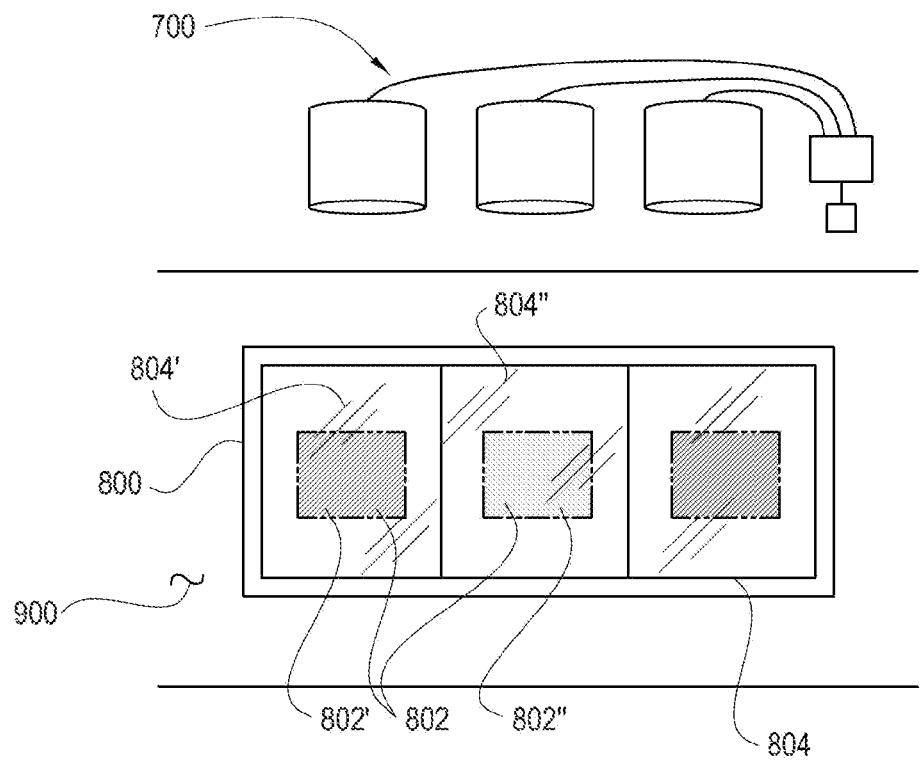
Fig. 4
Fig. 5

LIGHTING SYSTEM FOR ACCENTING REGIONS OF A LAYER AND ASSOCIATED METHODS

RELATED APPLICATIONS

This application is a continuation-in-part of U.S. patent application Ser. No. 13/709,942 titled System for Generating Non-Homogenous Light and Associated Methods filed Dec. 10, 2012, which is, in turn, related to and claims the benefit of U.S. Provisional Patent Application Ser. No. 61/643,308 titled Tunable Light System and Associated Methods filed May 6, 2012, U.S. Provisional Patent Application Ser. No. 61/643,316 titled Luminaire Having an Adaptable Light Source and Associated Methods filed May 6, 2012, and is a continuation-in-part of U.S. patent application Ser. No. 13/107,928 titled High Efficacy Lighting Signal Converter and Associated Methods filed May 15, 2011, and U.S. patent application Ser. No. 13/234,371 titled Color Conversion Occlusion and Associated Methods filed Sep. 16, 2011, the contents of which are incorporated in their entirety herein.

FIELD OF THE INVENTION

The present invention relates to lighting systems that selectively emit light containing specific wavelength ranges and layers responsive to the emitted light, and associated methods.

BACKGROUND OF THE INVENTION

Making a picture, character, or otherwise identifiable image appear on a surface has usually involved the projection of the image on an otherwise blank surface. Moreover, the progression of a sequence of images, such as simulating motion, has tended to include either a series of projecting devices working in sequence to project the images, or a single projecting device that moves or rotates. However, such systems typically require the environment in which the image is to be perceived to be relatively darker, or the image may be difficult to perceive. Moreover, the projection of an image onto a non-blank surface makes the image difficult to recognize.

Images have been embedded in random, pseudo-random, or otherwise non-recognizable patterns. This is useful for entertainment, where an image becomes apparent where it once was not apparent. For example, autostereograms are well known. However, prior embedded images have typically relied on biological responses, such as the decoupling of eye convergence, in order for the embedded image to become apparent, and not all observers are able to accomplish such decoupling. Other systems rely on a filter to be positioned intermediate the embedded image and the observer, usually in the form of eyewear. These systems are generally undesirable, as the eyewear is not conducive to ordinary activities. Accordingly, there is a need for a system for eliciting embedded images without impeding the activity of the observer, and that is readily observable by all observers.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the foregoing in mind, embodiments of the present invention are related to a system for accenting a region of a layer comprising a lighting system that includes a plurality of light sources and a layer configured to be applied to a surface of a structure. The layer may include a first region having a first surface scatter profile and a second region having a second surface scatter profile. The light emitted by the plurality of light sources may combine to form a polychromatic combined light. Additionally, the first surface scatter profile may be configured to diffusively scatter a combined light including a first wavelength. Furthermore, the second surface scatter profile may be configured to diffusively scatter a combined light including a second wavelength. The combined light may be at least one of a first polychromatic light including the first wavelength and excluding the second wavelength and a second polychromatic light including the second wavelength and excluding the first wavelength.

Another embodiment of the present invention is related to a system for accenting a region of a layer comprising a lighting system that includes a plurality of light sources and a computerized device operably connected to each of the plurality of light source. The computerized device may be configured to individually operate each of the plurality of light sources. The lighting system may further comprise a layer configured to be applied to a surface of a structure. The layer may comprise a first region and a second region, wherein each of the first region and the second region have a surface scatted profile configured to diffusively scatter a combined light including a first scattering wavelength. The plurality of light sources may comprise a first light source positioned generally adjacent to the first region and a second light source positioned generally adjacent to the second region. The light emitted by the first light source may not be incident upon the second region and light emitted by the second light source may not be incident upon the first region. The computerized device may be programmable to selectively operate the first light source and the second light source such that only one of the first light source and the second light source emits light comprising the first scattering wavelength at a time.

Another embodiment of the present invention is related to a system for accenting sub-surface regions comprising a lighting system substantially as described above. A first appliqué may be formed into a first image and adapted to be applied to a surface such that light from the first light source is incident thereupon and light from the second light source is not incident thereupon. A second appliqué may be formed into a second image and adapted to be applied to the surface such that light from the second light source is incident thereupon and light from the first light source is not incident thereupon. Each of the first appliqué and second appliqué may be configured to diffusively scatter a scattering wavelength within the visible spectrum. The computerized device may be configured to selectively operate the first light source and the second light source such that only one of the first light source and the second light source emits light comprising the scattering wavelength at a time.

Another embodiment of the present invention is related to a system for accenting sub-surface regions comprising a lighting system substantially as described above. Again, a first appliqué may be formed into a first image and adapted to be applied to a surface such that light from the first light source is incident thereupon and light from the second light source is not incident thereupon. A second appliqué may be formed into a second image and adapted to be applied to a surface such that light from the second light source is incident thereupon and light from the first light source is not incident thereupon. Each of the first appliqué and second appliqué may include a color conversion material configured to convert a source light including a source wavelength into a converted light including a second wavelength within the visible spectrum. The computerized device may be configured to selectively operate the first light source and the second light source such that only one of the first light source and the second light source emits light comprising the scattering wavelength at a time.

Yet another embodiment of the present invention is related to a layer that is applicable to a surface of a structure comprising a pseudo-random pattern comprising at least one of a variety of shapes, a variety of colors, and a variety of textures. A first region may have a first surface scatter profile that diffusively scatters a combined light comprising a first wavelength, and a second region having a second surface scatter profile that diffusively scatters a combined light comprising a second wavelength. Each of the first region and the second region may be configured to diffusively scatter light so as to depict an image embedded in the pseudo-random pattern. The image depicted by the first region may not be observable when light incident thereupon does not include the first wavelength, and the image depicted by the second region is not observable when light incident thereupon does not include the second wavelength.

Another embodiment of the present invention is related to a method of using the above system that may comprise the steps of emitting a first combined light including a first wavelength equal to a diffuse scattering wavelength of the first region and excluding a second wavelength equal to a diffuse scattering wavelength of the second region. The method may also include diffusively scattering the first combined light from the first region, emitting a second combined light including the second wavelength and excluding the first wavelength, and diffusively scattering the second combined light from the second region.

Still another embodiment of the present invention is related to a method of accenting a region of a layer. The method may comprise the steps of providing a layer comprising a pseudo-random pattern having embedded therein a plurality of regions. Each region may have an individual surface scatter profile configured to diffusively scatter an individual light wavelength, and each region depicting one image of a sequential series of images, and emitting a sequence of polychromatic light. Each polychromatic light may include one individual light wavelength that is diffusively scattered by one of the plurality of regions. The sequence of polychromatic light may be configured to correspond to the sequential series of images.

BRIEF DESCRIPTION OF THE DRAWINGS

FIG. 4 is a side elevation view of the lighting system and surface of FIG. 1.

FIG. 5 is a side sectional view of a surface according to an alternative embodiment of the invention.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Figure 1:
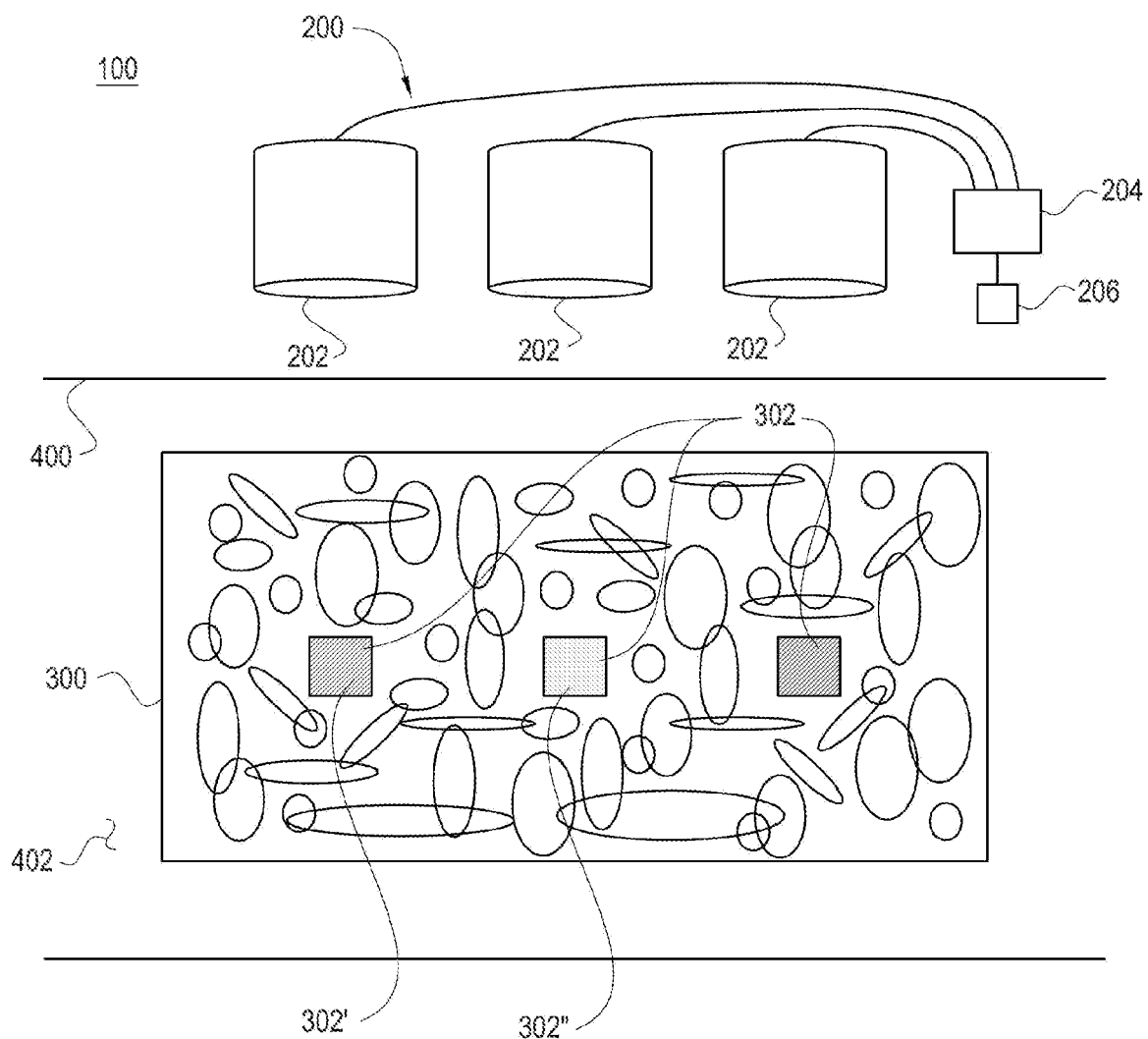
FIG. 1 is a side elevation view of a lighting system and surface according to an embodiment of the invention.

An embodiment of the invention, as shown and described by the various figures and accompanying text, provides a system 100 comprising a lighting system 200 and a layer 300, as shown in FIG. 1. The lighting system 200 may be configured to emit light having certain characteristics of light that interact with certain regions 302 of the layer 300 to accent those regions.

The lighting system 200 may comprise a plurality of light sources 202. The plurality of light sources 202 may each be a light-emitting device configured to emit light having certain light characteristics. Examples of light characteristics that may be controlled in the emission of light include wavelength, luminous intensity, color, and color temperature. Moreover, each light source 202 may be configured to emit monochromatic light or polychromatic light. Additionally, the plurality of light sources 202 may include a type of light source, including, but not limited to, an incandescent source, a fluorescent source, a light-emitting semiconductor such as a light-emitting diode (LED), a halogen source, an arc source, or any other light source known in the art. More information regarding the operation and characteristics of the plurality of light sources 202 may be found in U.S. patent application Ser. No. 13/709,942, the entire contents of which is incorporated by reference hereinabove.

Continuing to refer to FIG. 1, the layer 300 will now be discussed in greater detail. The layer 300 may be a layer of material configured to be applied to the surface 402 of a structure 400. Furthermore, the layer 300 may include one or more regions 302 that are configured to interact with light emitted by the lighting system 200 so as to be accented. In some embodiments, the layer 300 may comprise a first region 302' and a second region 302". The first region 302' may be configured to have a first surface scatter profile. More specifically, the first region 302' may be configured to reflect, scatter, diffusely reflect, diffusively scatter, or otherwise redirect light within a scattering wavelength range and absorb light outside the scattering wavelength range. Furthermore, the first region 302' may be configured to reflect, scatter, diffusely reflect, or otherwise redirect light having a certain scattering wavelength and absorb light having a different wavelength. The scattering wavelength range and the scattering wavelength may be associated with a color. Similarly, the second region 302" may have a second surface scatter profile that is configured to reflect, scatter, diffusely reflect, or otherwise redirect light within a certain scattering wavelength range and absorb light outside the scattering wavelength range, or reflect, scatter, diffusely reflect, or otherwise redirect light having a certain scattering wavelength and absorb light having a different wavelength. The scattering wavelength range and scattering wavelength may be associated with a color. Additionally, the first surface scatter profile may be configured to reflect, scatter, diffusely reflect, or otherwise redirect light associated with a color that is also the same as or similar to the color of light that the second surface scatter profile is configured to reflect, scatter, diffusely reflect, or otherwise redirect, or it may be of a different color.

The first region 302' and the second region 302" may be positioned anywhere on the layer 300. In some embodiments, the first region 302' may be positioned at some distance from the second region 302". In some embodiments, the first region 302' and the second region 302" may be relatively near to each other. The distance between each of the first region 302' and the second region 302" may be configured based upon the entire length of the surface 402, the sizes of each of the first region 302' and the second region 302", the number of any other regions 302 apart from the first and second regions 302', 302", or any other configuration. Additionally, the distance between the first and second regions 302', 302" may be determined based on a center-to-center determination or an edge-to-edge determination. The above configurations are exemplary only and do not limit the scope of the invention.

Additionally, each of the first region 302' and the second region 302" may be configured into a desired shape. In some embodiments, each of the first and second regions 302', 302" may be shaped into a representation of a recognizable object, character, ideogram, numeral, or image. In some embodiments, the first region 302' may be shaped into a representation a first object, character, ideogram, numeral, or image in a sequence, and the second region 302' may be shaped into a representation of a second object, character, ideogram, numeral, or image in the sequence. It is appreciated that any number of regions 302 may be configured to represent any number of items in a sequence.

The regions 302 may be formed into the layer 300 by any suitable means, methods, or process. In some embodiments, the layer 300 may include a base material 304, and each of the regions 302 are topically attached to a surface 306 of the base material. Examples of topical attachment including painting, adhesives, glues, transfers, appliqués, static cling, magnetism, and any other method of topical attachment are included within the scope of the invention.

In some embodiments, the regions 302 may be configured to have a first section configured to diffusively scatter light within the scatter wavelength range as described herein above, and a second section configured to absorb light within the scatter wavelength range. For example, in some embodiments, a perimeter of the regions 302 may be configured to absorb light within the scatter wavelength range and an interior of the regions 302 may be configured to diffusively scatter light within the scatter wavelength range. In other embodiments, an interior section of the regions 302 may be configured to absorb light within the scatter wavelength range, and the section of the regions 302 surrounding the interior section may be configured to diffusively scatter light within the scatter wavelength range.

The layer 300 may be any material and of any form that may be applied and attached to a surface of a structure, either fixedly or temporarily. Examples of such forms include, without limitations, paints, sheets of material such as wallpaper, wall coverings, structural wall features, and any other forms known in the art.

The lighting system 200 may be configured to include a plurality of light sources 202 that are capable of emitting light falling within the scatter wavelength ranges of each of the first surface scatter profile and the second surface scatter profile. In some embodiments, the light emitting elements of the plurality of light sources 202 may be configured to generate polychromatic light having varying spectral power distributions. In other embodiments, the plurality of light sources 202 may emit light, either monochromatic or polychromatic, that combines to form a combined polychromatic light. In either of these embodiments, the polychromatic light may include within its spectral power distribution light within a wavelength range corresponding to a scatter wavelength range associated with one of the first surface scatter profile and the second surface scatter profile, or both. Furthermore, the polychromatic light may be perceived as a white light by an observer.

In some embodiments, the plurality of light sources 202 may be positioned in an array, the array being positionable adjacent to a ceiling. In such embodiments, the layer 300 may be attached to a surface of a wall such that light emitted by the plurality of light sources 202 is incident upon the layer 300.

When the polychromatic light is incident upon the first region 302' and the second region 302", each of the wavelengths included within the spectral power distribution of the polychromatic light will be either absorbed or reflected, scattered, diffusely reflected, or otherwise redirected by each of the regions. More specifically, when the polychromatic light includes a wavelength within a scatter wavelength range associated with one of the first region 302' or the second region 302", or both, the associated scatter wavelength range will be scattered, while the remainder of the spectral power distribution will be absorbed. Accordingly, the light within the scatter wavelength range will be reflected, scattered, diffusely reflected, or otherwise redirected into the environment and observable. Moreover, where the region 302 that is scattering the light is shaped to represent an object, character, ideogram, numeral, or image, that representation will similarly be observable. Correspondingly, when the spectral power distribution of the polychromatic light does not include light within a scatter wavelength range associated with the first region 302' or the second region 302", the regions 302 will absorb approximately the entire spectral power distribution, no light will be scattered, and the regions will be generally less noticeable.

It is appreciated that in a spectral power distribution, lower levels of light within the scatter wavelength ranges associated with each of the regions 302 may be present, even when not intentionally emitted by the lighting system 200. Accordingly, where the lighting system 200 causes the plurality of lighting devices 202 to emit polychromatic light having a peak within its spectral power distribution within a scatter wavelength range associated with one of the first region 302' or the second region 302', or both, the region 302 with that scatter wavelength range will be generally more apparent, noticeable, and accented than when the spectral power distribution does not include such a peak, but does still include a relatively lower level of light within the scatter wavelength range.

In some embodiments, the lighting system 200 may include a controller 204 configured to selectively operate the plurality of light sources 202. Furthermore, the controller 204 may be configured to operate the plurality of light sources 202 so as to selectively emit light having a wavelength within the scatter wavelength range of one of the first region 302' or the second region 302", or both. Furthermore, the controller 204 may be configured to operate the plurality of light sources 202 to emit a first polychromatic light including within its spectral power distribution a wavelength within a wavelength range associated with the first region 302', and a second polychromatic light including within its spectral power distribution a wavelength within a wavelength range associated with the second region 302". In this way, the controller 204 may selectively make more prominent to an observer the first region 302', the second region 302", or both, by causing the plurality of light sources 202 to emit a polychromatic light to include a wavelength within the respective scatter wavelength ranges.

In some embodiments, the lighting system 200 may further include a memory 206 in electronic communication with the controller 204. The memory 206 may contain an electronic file that is accessible and readable by the controller 204. The electronic file may include one or more instructions that may be read by the controller 204 that may then cause the controller 204 to operate the plurality of light sources 202 in accordance with the instructions. The instructions may include commands to operate one or more of the plurality of light sources 202 to emit polychromatic light such that the spectral power distribution of the polychromatic light includes or excludes light within a wavelength range associated with a scatter wavelength range of one or both of the first region 302' and the second region 302". Moreover, the instructions may provide a sequence of commands to thusly operate one or more of the plurality of light sources 202 so as to accent and make more noticeable the sequence represented in the first and second regions 302', 302". For example, the instructions may include a sequence of wavelengths to be emitted including a first wavelength and a second wavelength. The controller 204 may then determine a first polychromatic light comprising a plurality of wavelengths to be emitted by the plurality of light sources 302 including the first wavelength and excluding the second wavelength. The controller 204 may then operate the plurality of light sources 302 to emit the first polychromatic light. The controller 204 may then determine a second polychromatic light comprising a plurality of wavelengths including the second wavelength and excluding the first wavelength. The controller 204 may then operate the plurality of light sources 302 to emit the second polychromatic light. It is appreciated that the instructions may contain any number of wavelengths in a sequence, and a corresponding number of polychromatic lights including one or more of the wavelengths in the sequence may be determined by the controller 204.

In some embodiments, where one or both of the regions 302 are shaped to represent an object, character, ideogram, numeral, or image, when the polychromatic light includes light within the scatter wavelength range of that region 302, the represented object, character, ideogram, numeral, or image will become highlighted, more apparent, noticeable, and accented. As a result, an observer will be more likely to observe and recognize the object, character, ideogram, numeral, or image when the polychromatic light includes light within the scatter wavelength range. Moreover, where the regions 302 include sequential representations, the sequence of those images may similarly be observable.

Figure 2:
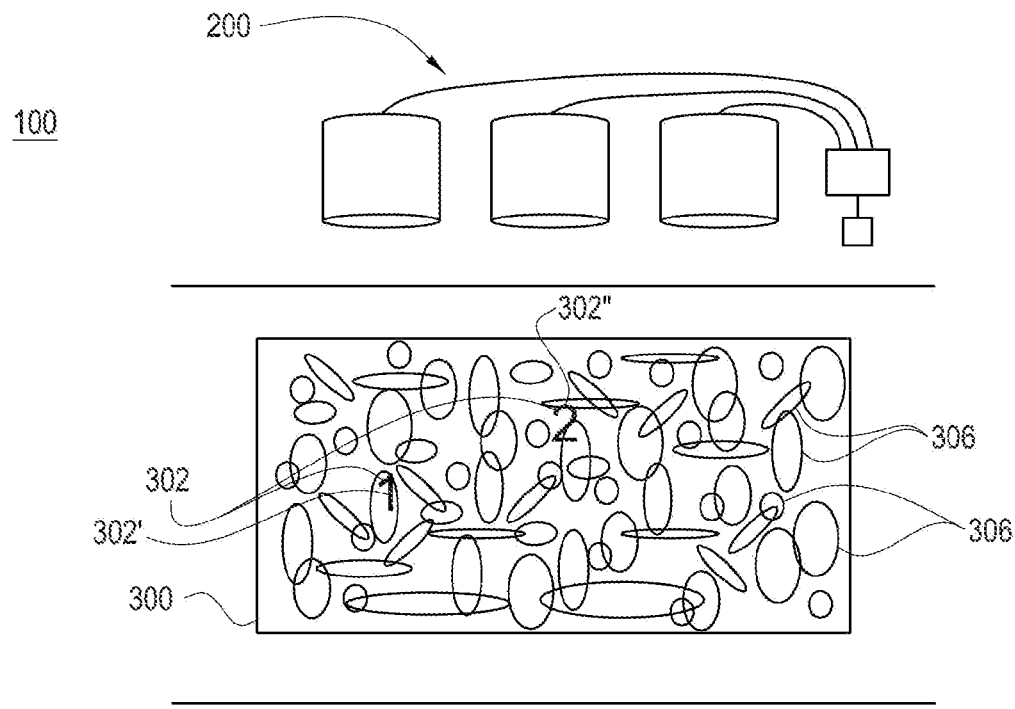
FIG. 2 is a side elevation view of an alternative embodiment of the invention.

For example, referring now to FIG. 2, the first region 302' may be configured into the shape of a numeral, for example, the number 1. Similarly, the second region 302" may be configured into the shape of another numeral, such as the sequential number 2. When the polychromatic light includes within its spectral power distribution a wavelength within the scatter wavelength range associated with the first region 301', the first region 301' will be more prominent to an observer. Accordingly, the number 1 will be more prominent to an observer. Furthermore, if the polychromatic light also includes light within its spectral power distribution a wavelength within the scatter wavelength range associated with the second region 302", the second region 302" will similarly be more prominent, and an observer may more readily see the number 2. The polychromatic light may include both wavelengths associated with the scatter wavelength ranges of the respective regions 302 simultaneously, or it may include them successive or otherwise sequential polychromatic lights, requiring the polychromatic light to vary with time. In this way, any type of sequence, be it a sequence of numbers, letters to form a word, or sequences of images to simulate motion, may be made more prominent across the layer 300.

Furthermore, it is appreciated that the regions 302 may be positioned such that the sequence may be oriented to proceed in any direction across the layer 300. For example, the regions 302 may be positioned such that the sequence progresses laterally, vertically, or in any other geometric configuration, such as a sinusoidal wave, stair-step, a circle, and any other orientation. This list is exemplary only and does not limit the scope of the invention.

In some embodiments, the layer 300 may further include non-accented regions 306 positioned on the layer 300 generally surrounding the regions 302. The non-accented regions 306 may be configured to facilitate the making more prominent and noticeable the regions 302 when the associated scatter light wavelength is incident thereupon. Moreover, the non-accented regions 306 may be configured to make the regions 302 generally less prominent or noticeable when the associated scatter light wavelength is not present. The non-accented regions 306 may be generally amorphous, random, pseudo-random, or otherwise not recognizable by an observer to be recognizable as an object, character, ideogram, numeral, or image.

Figure 3:
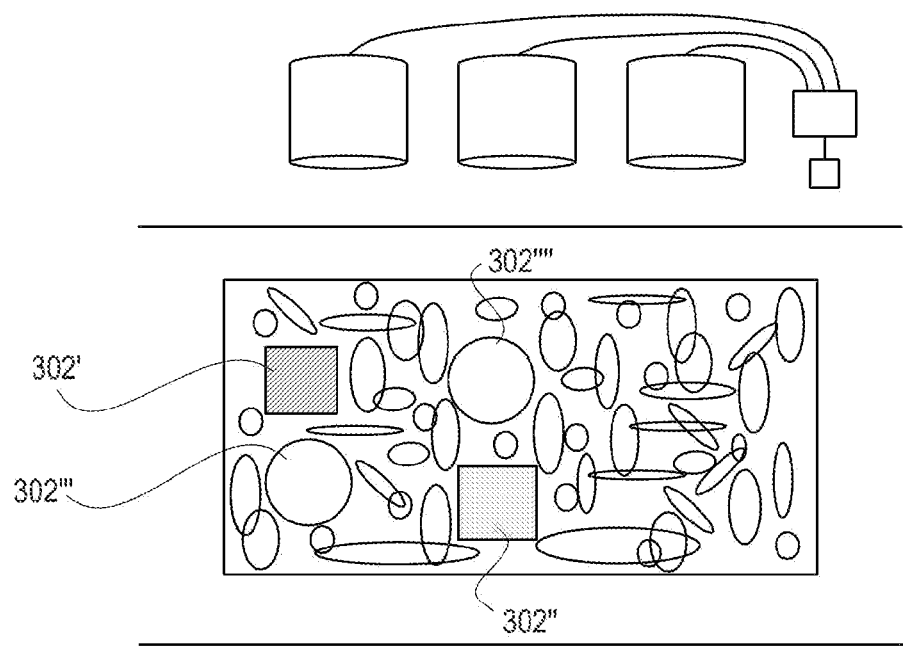
FIG. 3 is a side elevation view of an alternative embodiment of the invention.

Referring now to FIG. 3, another embodiment of the present invention is depicted. In this embodiment, the layer 300 includes a plurality of regions 302, namely a first region 302', a second region 302" and third region 302''', and a fourth region 302''''. Similar to the regions described above, the regions 302', 302", 302''', 302'''' of FIG. 3 may each have an associated surface scatter profile configured to reflect, scatter, diffusively reflect, or otherwise redirect light incident thereupon that is within a scatter wavelength range or is a scatter wavelength. All light having a wavelength outside the scatter wavelength range or that is different from the scatter wavelength are absorbed.

The third region 302''' may be generally adjacent the first region 302', and the fourth region 302'''' may be generally adjacent the second region 302". Additionally, the third region 302''' may have a surface scatter profile that is configured to scatter light within a scatter wavelength range that is about the same as a scatter wavelength range of the first region 302', or it may be different from the scatter wavelength range of the first region 302'. Similarly, the fourth region 302'''' may have a surface scatter profile that is configured to scatter light within a scatter wavelength range that is about the same as a scatter wavelength range of the second region 302", or it may be different from the scatter wavelength range of the second region 302". Where the first and third regions 302', 302''' have scatter wavelength ranges that are about the same, when light within that range is present, due to their close proximity, both the first region 302' and the third region 302''' will scatter the light as described above and become accented or otherwise more prominent. Where the first and third regions 302', 302''' have scatter wavelength ranges that are different, one or both of the first and third regions 302', 302''' may be made more prominent by a polychromatic light containing a wavelength within the scatter wavelength range of one or both of the first and third regions 302', 302''', i.e. one polychromatic light may include a wavelength within the scatter wavelength range of one of the first and third regions 302', 302''', and a second polychromatic light may include two wavelengths, one within the scatter wavelength range of the first region 302', and the other within the scatter wavelength range of the third region 302'''. Accordingly, the first and third regions 302', 302''' may be selectively accented. The same may be accomplished with the second and fourth regions 302'', 302''''.

Referring now to FIG. 4, an additional embodiment of present invention is depicted. The present embodiment may include a system 400 comprising a lighting system 500 and a layer 600, substantially as described for the embodiment depicted in FIGS. 1-4. However, in the present, the layer 600 includes regions 602, namely a first region 602' and a second region 602'', which are configured to have approximately identical surface scatter profiles that are configured to scatter light within a scatter wavelength range. Additionally, the first region 602' and the second region 602'' may be positioned on the layer 600 so as to be spaced apart.

Still referring to FIG. 4, the lighting system 500 may include a first light source 502 and a second light source 504. The first light source 502 may be positioned such that light emitted by the first light source 502 is incident upon the first region 602' but is not incident upon the second region 602''. Similarly, the second light source 504 may be positioned such that light emitted thereby is incident upon the second region 602'' but not upon the first region 602'. The lighting system 500 may further include a controller 506 configured to selectively operate each of the first light source 502 and the second light source 504 independently of each other. Furthermore the controller 506 may be configured to operate each of the first and second light sources 502, 504 to emit polychromatic light. Yet further, the controller 506 may be configured to operate each of the first and second light sources 502, 504 such that, in a first instance, the first light source 502 emits a polychromatic light having a spectral power distribution including a wavelength within the scatter wavelength range of the first and second regions 602', 602'', and the second light source 504 emits a polychromatic light having a spectral power distribution not including a wavelength within the scatter wavelength range of the first and second regions 602', 602''. Because light emitted by the first light source 502 is incident upon the first region 602' and not the second region 602'', only the first region 602' scatters the lighting within the scatter wavelength range and, hence, is made more prominent or noticeable.

Furthermore, the controller 506 may be configured to operate each of the first and second light sources 502, 504 such that, in a second instance, the first light source 502 emits a polychromatic light having a spectral power distribution not including a wavelength within the scatter wavelength range of the first and second regions 602', 602'', and the second light source 504 emits a polychromatic light having a spectral power distribution including a wavelength within the scatter wavelength range of the first and second regions 602', 602''. Because light emitted by the second light source 502 is incident upon the second region 602'' and not the first region 602', only the second region 602'' scatters the lighting within the scatter wavelength range and, hence, is made more prominent or noticeable.

The lighting system 500 may further include a memory 508 substantially as described above. The memory 508 may include instructions that are readable by the controller 506 that may include a sequence of wavelengths that may be used by the controller 506 to generate a sequence of polychromatic lights including one or more of the sequence of wavelengths that may be scattered by one or more of the regions 602.

Referring now to FIG. 5, another embodiment of the present invention is now depicted. Some embodiments may include a lighting system 700 and a layer 800. The lighting system 700 may be substantially as described above, including a plurality of light sources 702 capable of emitting polychromatic light and a controller 704 coupled to each of the plurality of light sources 702 so as to control their emission.

The layer 800 may include one or more appliqués 802 attached to a surface 900. The appliqués 802 may be functionally similar to the regions 302, 602, described hereinabove, namely, have a scatter profile configured to diffusively scatter light within a scatter wavelength range and absorb light outside the scatter wavelength range. Similar to above, the appliqués 802 may be configured to wave scatter wavelength ranges that are approximately the same or are different. In some embodiments, the layer 800 may include a first appliqué 802' and a second appliqué 802''. Additionally, the surface 900 may be configured to absorb light within the scatter wavelength range.

The appliqués 802 may be configured into a shape as described hereinabove for the regions 302, 602. Additionally, the appliqués 802 may be configured into shapes corresponding to a sequence or series. Furthermore, the appliqués 802 may be positioned about the layer 800 in any geometric configuration, as described hereinabove.

The layer 800 may further include a cover layer 804. The cover layer 804 may be positioned so as to generally cover the surface 900 and the appliqués 802. Where the cover layer 804 is so positioned, in order for any light to be incident upon the appliqués 802, it must traverse through the cover layer 804. Accordingly, the cover layer 804 may be configured to be transparent, translucent, or otherwise permit the traversal of light therethrough. In some embodiments, the cover layer 804 may be transparent to the entire spectrum of light. In some embodiments, the cover layer 804 may be transparent to only a portion of the spectrum of light, such as, for example, the visible spectrum, the infrared spectrum, and the ultraviolet spectrum. Furthermore, in some embodiments, the cover layer 804 may be configured to be transparent to a portion of the visible spectrum. In some embodiments, the cover layer 804 may be transparent to one or more portions of the visible spectrum corresponding to one or more scatter wavelength spectrums associated with the appliqués 802. For example, if the first appliqué 802' and the second appliqué 802'' have scatter wavelength spectrums that are approximately equal, the cover layer 804 may be transparent to light within the scatter wavelength spectrum. As another example, where the first appliqué 802' has a scatter wavelength range that is different from that of the second appliqué 802'', the cover layer 804 may be transparent to light within the scatter wavelength ranges of each of the first appliqué 802' and the second appliqué 802''.

Moreover, in some embodiments, the cover layer 804 may include a first section 804' associated with and positioned so as to generally cover the first appliqué 802' and a second section 804'' associated with and positioned so as to generally cover the second appliqué 802''. The first section 804' may be configured to be generally transparent to light within a wavelength range corresponding to the scatter wavelength range of the first appliqué 802', and the second section 804'' may be configured to be generally transparent to light within a wavelength range corresponding to the scatter wavelength range of the second appliqué 802''.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A system for accenting a region of a layer comprising:
   a lighting system comprising a plurality of light sources; and
   a layer configured to be applied to a surface of a structure, the layer comprising a first region having a first surface scatter profile and a second region having a second surface scatter profile;
   wherein the light emitted by the plurality of light sources combines to form a polychromatic combined light;
   wherein the first surface scatter profile is configured to diffusively scatter a combined light including a first wavelength;
   wherein the second surface scatter profile is configured to diffusively scatter a combined light including a second wavelength; and
   wherein the combined light is at least one of a first polychromatic light including the first wavelength and excluding the second wavelength and a second polychromatic light including the second wavelength and excluding the first wavelength.

2. A system according to claim 1 wherein the layer comprises a pseudo-random pattern including the first region and the second region.

3. A system according to claim 1 wherein the first region is configured to depict a first image; and wherein the second region is configured to depict a second image.

4. A system according to claim 3 wherein the second image is a sequential image of the first image.

5. A system according to claim 1 wherein the layer is a sheet of material configured to be applied to the surface.

6. A system according to claim 1 wherein the layer comprises a base material that is applied to the surface, and wherein each of the first region and second region are a topical material that is applied to the base material.

7. A system according to claim 1 wherein each light source comprises a plurality of light-emitting diodes.

8. A system according to claim 1 wherein the combined light is a white light.

9. A system according to claim 1 wherein the layer further comprises a third region positioned generally adjacent to the first region and having a third surface scatter profile and a fourth region positioned generally adjacent to the second region and having a fourth surface scatter profile; wherein the third surface scatter profile is configured to diffusively scatter a combined light including a third wavelength; wherein the fourth surface scatter profile is configured to diffusively scatter a combined light including a fourth wavelength wherein the first polychromatic light further includes the third wavelength; and wherein the second polychromatic light includes the fourth wavelength.

10. A system according to claim 1 further comprising a computerized device operably coupled to each of the plurality of light sources and configured to individually operate each of the plurality of light sources; wherein the plurality of light sources comprises a first light source positioned generally adjacent to the first region and a second light source positioned generally adjacent to the second region; wherein light emitted by the first light source is not incident upon the second region and light emitted by the second light source is not incident upon the first region; and wherein the computerized device is programmable to selectively operate the first light source and the second light source such that only one of the first light source and the second light source emits light comprising the first scattering wavelength at a time.

11. A system according to claim 10 wherein the layer further comprises a third region and a fourth region; wherein each of the third region and the fourth region have a surface scatter profile configured to diffusively scatter a combined light including a second scattering wavelength; wherein the third region is positioned generally adjacent to the first region such that light emitted by the first light source is incident thereupon and light emitted by the second light source is not incident thereupon; wherein the fourth region is positioned generally adjacent to the second region such that light emitted by the second light source is incident thereupon and light emitted by the first light source is not incident thereupon; and wherein the computerized device is programmable to selectively operate each of the first light source and the second light source such that only one of the first light source and the second light source emits a polychromatic light comprising each of the first scattering wavelength and the second scattering wavelength at a time.

12. A system according to claim 1 further comprising:
   a computerized device operably coupled to each of the plurality of light sources and configured to individually operate each of the plurality of light sources; and
   a memory associated with the computerized device comprising a sequence of the first wavelength and the second wavelength;
   wherein the computerized device is programmable to determine a first set of wavelengths including the first wavelength and excluding the second wavelength and a second set of wavelengths including the second wavelength and excluding the first wavelength; and
   wherein the computerized device is programmable to operate the plurality of light sources to produce the first set of wavelengths for a first period of time and the second set of wavelengths for a second period of time.

13. A system according to claim 1 wherein the plurality of light sources are arrangable to form an array; wherein the array of the plurality of light sources is configured to be positioned adjacent a ceiling; wherein the layer is configured to be disposed upon a wall surface; and wherein the layer is positionable such that light emitted by the plurality of light sources is incident upon the layer.

14. A method of accenting a region of a layer using a system comprising a lighting system including a plurality of light sources operable to emit polychromatic light and a layer positioned on a surface of a structure comprising a first region having a first surface scatter profile and a second region having a second surface scatter profile, wherein light emitted by the plurality of light sources combines to form a combined light, the method comprising the steps of:

emitting a first combined light including a first wavelength equal to a diffuse scattering wavelength of the first region and excluding a second wavelength equal to a diffuse scattering wavelength of the second region;

diffusively scattering the first combined light from the first region;

emitting a second combined light including the second wavelength and excluding the first wavelength; and diffusively scattering the second combined light from the second region.

15. A method according to claim 14 wherein the lighting system further comprises a computerized device operably connected to the plurality of light sources, wherein the computerized device is programmable to individually operate each of the plurality of light sources, and wherein the computerized device comprises a memory comprising a sequence of a first wavelength and a second wavelength, the method further comprising the steps of:

reading the first wavelength and the second wavelength from the sequence of wavelengths;

determining a first set of wavelengths to be included in the first combined light, the first set of wavelengths including the first wavelength and excluding the second wavelength, wherein the first combined light is a white light; and determining a second set of wavelengths to be included in the second combined light, the second set of wavelengths including the second wavelength and excluding the first wavelength, wherein the second combined light is a white light;

wherein the step of emitting the first combined light comprises the step of operating the plurality of light sources to produce each of the wavelengths of the first set of wavelengths; and wherein the step of emitting the second combined light comprises the step of operating the plurality of light sources to produce each of the wavelengths of the second set of wavelengths.

16. A method according to claim 14 wherein the layer further comprises a third region adjacent to the first region and having a third surface scatter profile and a fourth region adjacent to the second region and having a fourth surface scatter profile; wherein the step of emitting a first combined light further comprises including in the first combined light a third wavelength equal to a diffuse scattering wavelength of the third region and excluding a fourth wavelength equal to a diffuse scattering wavelength of the fourth region; and wherein the step of emitting a second combined light further comprises including in the second combined light the fourth wavelength and excluding the third wavelength; the method further comprising the steps of:

diffusively scattering the first combined light from the third region; and diffusively scattering the second combined light from the fourth region.

17. A method of accenting a region of a layer comprising the steps of:

providing a layer comprising a pseudo-random pattern having embedded therein a plurality of regions, each region having an individual surface scatter profile configured to diffusively scatter an individual light wavelength, and each region depicting one image of a sequential series of images; and emitting a sequence of polychromatic light by a lighting device configured to emit polychromatic light having varying spectral power distributions, wherein each polychromatic light includes one individual light wavelength that is diffusively scattered by one of the plurality of regions;

wherein the sequence of polychromatic light is configured to correspond to the sequential series of images.

18. A method according to claim 17 wherein the polychromatic light is a white light.

19. A method according to claim 17 wherein each of the images of the sequential series of images is adjacent to at least one other image of the sequential series of images, the method further comprising the step of emitting a sequence of polychromatic light including at least two individual wavelengths associated with non-adjacent images.

20. A system for accenting a region of a layer comprising:
a lighting system comprising:
a plurality of light sources; and
a computerized device operably connected to each of the plurality of light source and configured to individually operate each of the plurality of light sources; and
a layer configured to be applied to a surface of a structure, the layer comprising a first region and a second region, wherein each of the first region and the second region have a surface scatted profile configured to diffusively scatter a combined light including a first scattering wavelength;

wherein the plurality of light sources comprises a first light source positioned generally adjacent to the first region and a second light source positioned generally adjacent to the second region;

wherein light emitted by the first light source is not incident upon the second region and light emitted by the second light source is not incident upon the first region;

wherein the computerized device is programmable to selectively operate the first light source and the second light source such that only one of the first light source and the second light source emits light comprising the first scattering wavelength at a time.

21. A system according to claim 20 wherein the layer further comprises a third region and a fourth region; wherein each of the third region and the fourth region have a surface scatter profile configured to diffusively scatter a combined light including a second scattering wavelength; wherein the third region is positioned generally adjacent to the first region such that light emitted by the first light source is incident thereupon and light emitted by the second light source is not incident thereupon; wherein the fourth region is positioned generally adjacent to the second region such that light emitted by the second light source is incident thereupon and light emitted by the first light source is not incident thereupon; and wherein the computerized device is programmable to selectively operate each of the first light source and the second light source such that only one of the first light source and the second light source emits a polychromatic light comprising each of the first scattering wavelength and the second scattering wavelength at a time.

* * * * *